United States Patent [19]

Tsuchiya et al.

[11] Patent Number: 5,653,870

[45] Date of Patent: Aug. 5, 1997

[54] FILTER SYSTEM

[75] Inventors: Teruaki Tsuchiya; Yoshihisa Maeda; Yuusuke Fujii, all of Ibaraki, Japan

[73] Assignee: SMC Corporation, Tokyo, Japan

[21] Appl. No.: 468,757

[22] Filed: Jun. 6, 1995

[30] Foreign Application Priority Data

Jun. 15, 1994 [JP] Japan .................... 6-156734

[51] Int. Cl.$^6$ .................... B01D 27/08; B01D 35/30
[52] U.S. Cl. .................... 210/232; 210/238; 210/444; 210/445; 210/450; 55/502; 55/503; 55/510
[58] Field of Search .................... 210/232, 238, 210/443, 444, 445, 450; 55/502, 503, 510

[56] References Cited

U.S. PATENT DOCUMENTS

| | | |
|---|---|---|
| 2,473,986 | 6/1949 | Booth . |
| 2,727,634 | 12/1955 | O'Meara . |
| 2,991,885 | 7/1961 | Gutkowski . |
| 3,147,220 | 9/1964 | Avery . |
| 3,502,221 | 3/1970 | Butterfield . |
| 3,608,726 | 9/1971 | Crowther . |
| 3,746,171 | 7/1973 | Thomsen . |
| 3,897,342 | 7/1975 | Schmid . |
| 4,367,081 | 1/1983 | Harvey . |
| 4,689,147 | 8/1987 | Leoncavallo . |
| 4,732,294 | 3/1988 | Bohler . |
| 4,839,068 | 6/1989 | Reed et al. . |
| 5,026,478 | 6/1991 | Tanabe . |
| 5,114,572 | 5/1992 | Hunter . |
| 5,259,953 | 11/1993 | Baracchi . |
| 5,342,511 | 8/1994 | Brown et al. . |

FOREIGN PATENT DOCUMENTS

| | | |
|---|---|---|
| 1 461 446 | 4/1969 | Germany . |
| 1 915 923 | 10/1970 | Germany . |
| 26 49 103 | 5/1977 | Germany . |
| 2 100 140 | 12/1982 | United Kingdom . |

Primary Examiner—Thomas M. Lithgow
Attorney, Agent, or Firm—Oblon, Spivak, McClelland, Maier & Neustadt, P.C.

[57] ABSTRACT

The invention relates to a filter system, in which a filter case 3 and a filter cover 4 can be inserted or removed in easy and quick manner. On a cylindrical engaging portion of the filter case 3 with the filter cover 4, a plurality of projections 25 and a plurality of engaging recesses 26 engageable with each other are provided, and a vertical channel 26a extending in axial direction of the filter case 3 and a transverse channel 26b extending in circumferential direction are arranged.

9 Claims, 5 Drawing Sheets

FILTER SYSTEM

BACKGROUND OF THE INVENTION

1. Field of the Invention

The present invention relates to a filter system for filtering a fluid such as liquid or gas.

2. Prior Art

In cleaning the electronic components, precision fabrication parts, etc., cleaning solultion is filtered through a filter to improve degree or quality of cleaning. A filter system of this type generally comprises a filter element for filtering a fluid, a filter case in cylindrical shape with its upper end opened to accommodate the filter element, and a filter cover to close the upper end of the filter case, whereby the filter cover is provided with an inlet and an outlet for the fluid so that the fluid entering through the inlet is filtered while it passes through the filter element and is discharged through the outlet. The filter cover is fixed at an adequate position, and in case the filter element is to be replaced, the filter case is inserted into or removed from the filter cover.

However, in the conventional type filter system as described above, the filter cover and the filter case are fixed on each other by nut means, and the filter case must be inserted or removed using a tool such as spanners. Thus, insertion and removal of the filter case are considerably difficult to perform and are almost impossible to achieve by a single person. As a result, two workers are required, i.e. a worker to support the filter case and a worker to tighten and loosen the nut means using a tool. Moreover, because the filter element is pressed against the filter cover by means of a spring provided on inner bottom of the filter case, the filter case with considerable weight must be pressed against the filter cover by resisting spring force when the filter case is to be mounted. This requires application of substantial force and the worker must make strenuous efforts and may feel tired on hands.

There is also another type of filter system, in which the filter cover and the filter case are fixed on each other by fastening means such as a band. This is superior to the nut type system in that there is no need to tighten or loosen the nut using tool. However, it is as disadvantageous as the nut type system in that the weighty filter case must be pressed on the filter cover against the force of the spring.

In this connection, there are strong demands on the development of a filter system, in which the filter cover and the filter case can be easily inserted or removed.

SUMMARY OF THE INVENTION

It is a principal object of the present invention to provide a filter system, in which a filter case and a filter cover can be easily and quickly performed when a filter element is to be replaced.

It is another object of the present invention to provide a filter system, in which the filter case and the filter cover can be reliably fixed by simple engaging means.

It is still another object of the present invention to provide a filter system, which can also cope with the case where pressure of the fluid is high because the means to fix the filter case and the filter cover is provided in double.

To attain the above objects, the filter system according to the present invention comprises a filter element of cylindrical shape for filtering a fluid, a filter case where the filter element is accommodated, a filter cover removably mounted on the filter case by engagement, and spring means for elastically holding the filter element between the filter case and the filter cover, and the fluid entering through an inlet port is filtered as it passes through the filter element and is discharged through an outlet port, whereby a plurality of projections and a plurality of engaging recesses for fixing the filter case and the filter cover in coupled condition are provided on a cylindrical engaging portion of the filter case with the filter cover, and each of said engaging recesses has a vertical channel extending in axial direction of the filter case or the filter cover and a transverse channel extending transversely in circumferential direction from an end of the vertical channel.

In a preferred embodiment of the present invention, the transverse channel of the engaging recess is inclined in such direction that the filter case and the filter cover are brought closer to each other when the projections are moved along the transverse channel.

In an aspect of the present invention, an element holder supported by the spring means is arranged at the bottom of the filter case, and the element holder has a plurality of elastic holding pieces curved in arcuate form, and the lower end of the filter element is elastically held between these holding pieces.

In the present invention, in addition to the fixing means, which comprises said projections and said engaging recesses, it is possible to simultaneously use fixing means, which comprises a flange-shaped swelling portion each formed on outer periphery of side walls of the filter case and the filter cover and having tapered surface inclined in a direction to bring outer peripheries closer to each other, and a tightening band having channel-shaped cross-section for squeezing and tightening the tapered surfaces of the swelling portions from both sides.

It is preferable that the tightening band is made of a pair of arcuate members and these members are removably mounted on the filter cover.

A ring is provided in the swelling portion of the filter case, and a plurality of supporting pieces curved in arcuate form are mounted on the ring, and the intermediate portion of the filter element is elastically held by these supporting pieces.

Between the swelling portion of the filter case and the swelling portion of the filter cover, a seal ring for sealing the gap between the filter case and the filter cover is provided.

After the filter case and the filter cover are engaged in such manner that the projection reaches the depth of the vertical channel of the engaging recess, the filter case and the filter cover are rotated relative to each other and the projection is moved into the transverse channel. Then, the projection is engaged in the transverse channel, and the filter case and the filter cover are fixed on each other. When the filter case and the filter cover are rotated in a direction reverse to the direction during mounting, the projection is disengaged from the engaging recess, and the filter case is separated from the filter cover.

The filter case and the filter cover can be inserted into or removed from each other by a series of operation to press the filter case and the filter cover against each other and to rotate. Thus, the work is simple and working time is short, and a single worker can accomplish the task.

In case pressure of the fluid to be filtered is high, the tapered surface of the swelling portion on each of the filter cover and the filter case is tightened from both sides by the tightening band. As a result, by simultaneous use of the fixing means, which comprises the projections and the engaging recesses, and the fixing means, which comprises the tapered surfaces of the swelling portions and the tightening band, the filter case and the filter cover are fixed very firmly.

DETAILED DESCRIPTION OF THE PREFERRED EMBODIMENTS

Figure 1:
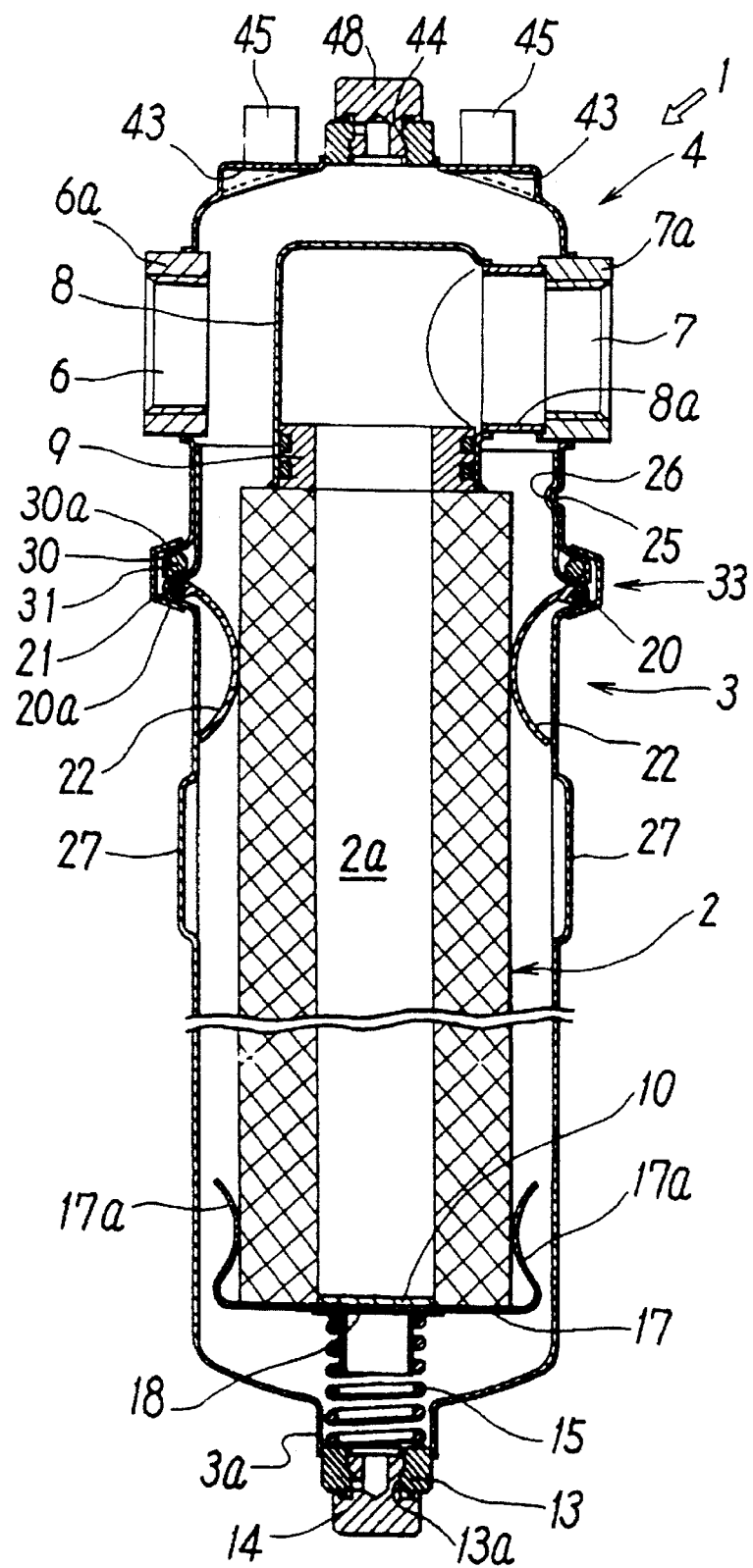
FIG. 1 is a longitudinal sectional view of a first embodiment of a filter system according to the present invention.
Figure 2:
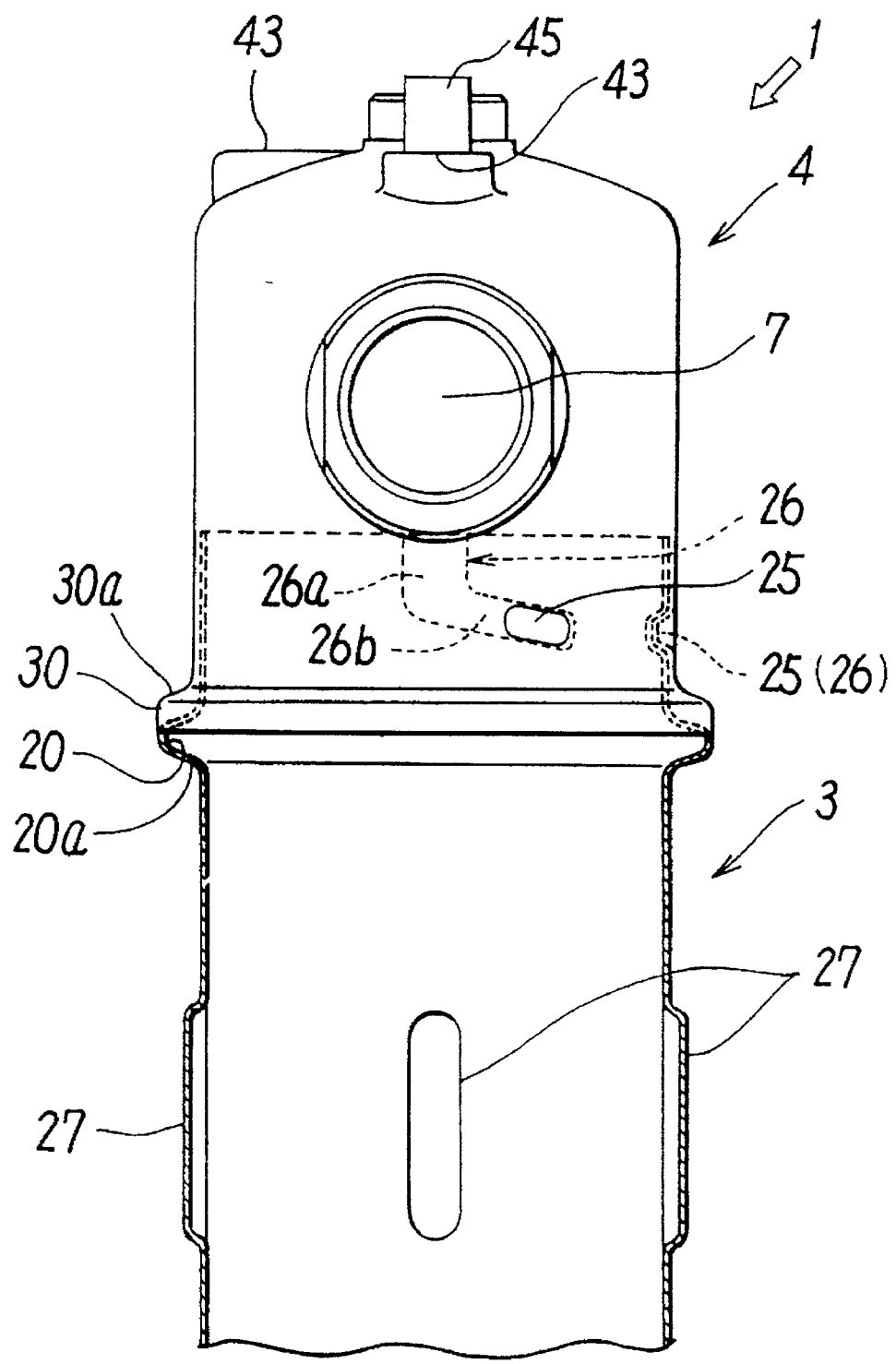
FIG. 2 is a front view of an essential portion of the embodiment of FIG. 1.
Figure 3:
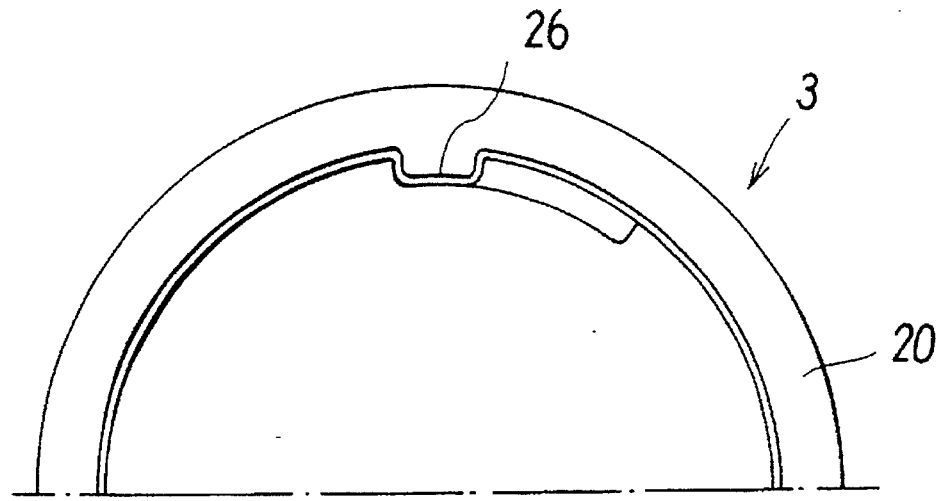
FIG. 3 is a plan view showing one-half of a filter case.

FIG. 1 to FIG. 6 each represents a first embodiment of a filter system of the present invention. The filter system 1 comprises a filter element 2 in cylindrical shape for filtering a fluid such as liquid or gas, a filter case 3 in cylindrical shape with its upper end open and for accommodating the filter element, and a filter cover 4 removably mounted on the upper end of the filter case 3. On the filter cover 4, an inlet port 6 and an outlet port 7 for fluid are provided. Upon entering through the inlet port 6, the fluid is filtered as it passes through the filter element 2 from outside toward a hollow portion 2 inside and is discharged through the outlet port 7.

The filter element 2 is made of polypropylene fiber or nonwoven fabric and formed in a hollow cylindrical shape. On upper end of it, an attachment 9 of cylindrical shape is fluid-tightly inserted into an element mounting unit 8 of the filter cover 4. The lower end of the hollow portion 2a is fluid-tightly closed by a closure member 10.

In the filter case 3 to accommodate the filter element 2, a drain member 13 having a drain outlet 13a is mounted on a small diameter portion 3a at its bottom by adequate means 5 such as welding, and a plug 14 is mounted on the drain outlet 13a. A spring 15 is arranged on the drain member 13. An element holder 17 provided with a plurality of elastic holding pieces 17a curved toward inside the filter case 3 is supported by the spring 15, and the lower end of the filter element 2 is elastically held between the holding pieces 17a of the element holder 17. Reference numeral 18 represents a spring seat on the lower surface of the element holder 17.

At a position closer to the upper end of the filter case 3, a flange-shaped swelling portion 20 surrounding the filter case is fabricated by expanding side wall of the filter case 3 outwardly to have approximately triangular cross-section. Inside the swelling portion 20, a segmental ring 21 in circular shape with a part of it lacking is engaged, and a plurality of supporting pieces 22 in arcuate shape curved inwardly in the filter case 3 are rotatably mounted, and the intermediate portion of the filter element 2 closer to the upper end is elastically supported by these supporting pieces 22.

The swelling portion 20 also serves as the fixing means for fixing the filter cover 4, and the lower surface of the swelling portion 20 has an inclined tapered surface 20, which is expanded upwardly.

Further, on the portion of the filter case 3, which is located above the swelling portion 20 and is engaged in the filter cover 4, a plurality of (preferably, three) engaging recesses 26 to be engaged with projections 25 of the filter cover are provided with equal spacings in circumferential direction of the filter case 3. As it is evident from FIGS. 2 and 3, each of the engaging recesses 26 comprises a vertical channel 26a extending downwardly along axial line of the filter case 3 from upper edge of the filter case 3 and a transverse channel 26b extending transversely in circumferential direction from the lower end of the vertical channel 26a, and the forward end of the transverse channel 26b is slightly inclined downward.

On the portion of the filter case 3 lower than the swelling portion 20, a plurality of (four in the figure) finger attachments 27, on which fingers are to be applied to attach or remove the filter case 3 to or from the filter cover 4, are provided at a given spacing in circumferential direction. These finger attachments 27 are fabricated by projecting a part of side wall of the filter case 3 in form of an elongated rib.

On the other hand, the filter cover 4 is designed in form of an inverted cup with its lower end opened. On its side wall, the inlet port 6 and the outlet port 7, into which a supply pipe and a discharge pipe (both not shown) for the fluid to be filtered are to be screwed, are provided by mounting cylindrical members 6a and 7a by adequate means such as welding. On the outlet port 7, the element mounting unit 8 with the attachment 9 of the filter element 2 closely fitted is mounted via an adaptor 8a.

On side wall of the portion of the filter cover 4 to be engaged with the upper end of the filter case 3, as many projections 25 as the engaging recesses 26 of the filter case 3 are provided. By engaging these projections 25 in the transverse channel 26b through the vertical channel 26a of the engaging recess 26, the filter case are coupled together and fixed. The projections 25 are fabricated by projecting the side wall of the filter cover 4 inwardly.

On the lower end of the side wall of the filter cover 4, a swelling portion 30 in form of flange and projected outwardly is formed to match the swelling portion 20 of the filter case 3, and the upper surface of the swelling portion 30 is designed as a tapered surface 30a incined and expanded downwardly. Between the swelling portion 30 and the swelling portion 20 of the filter case 3, a seal ring 31 is disposed. The tapered surfaces 20a and 30a of the two swelling portions 20 and 30 are fastened via the seal ring 31 by the tightening band 33, which has a spread-out chapel-shaped cross-section, and the filter cover 4 and the filter case 3 are coupled together and fixed.

Figure 4:
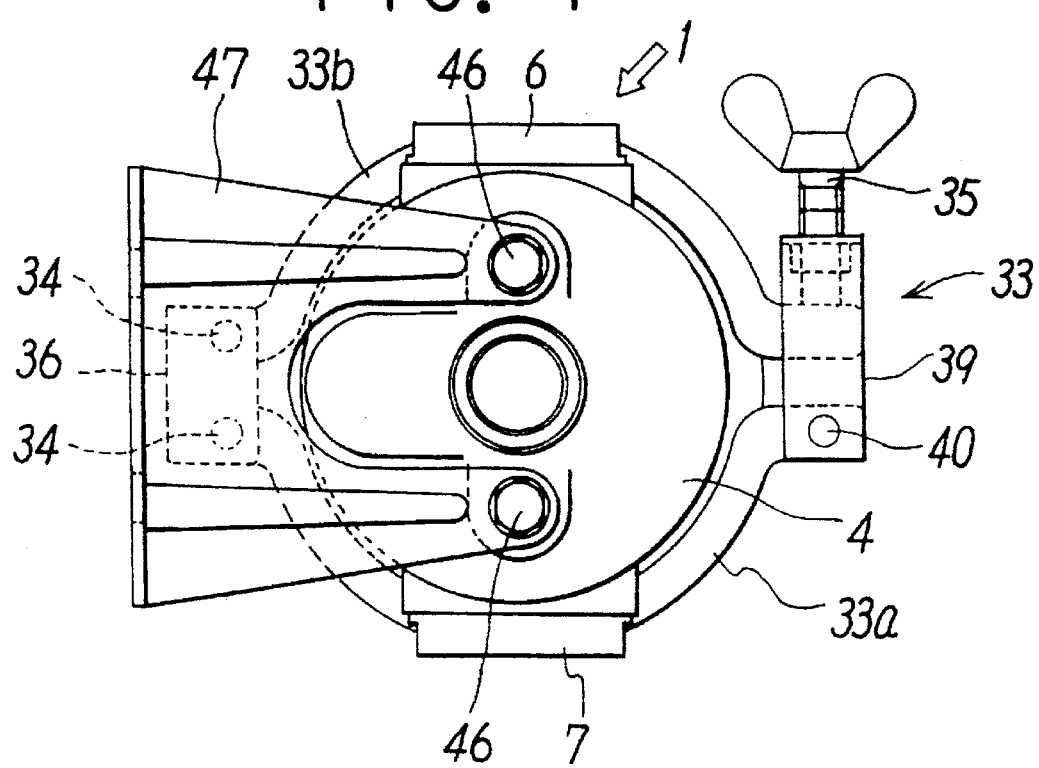
FIG. 4 is a plan view of a filter cover as it is mounted.
Figure 5:
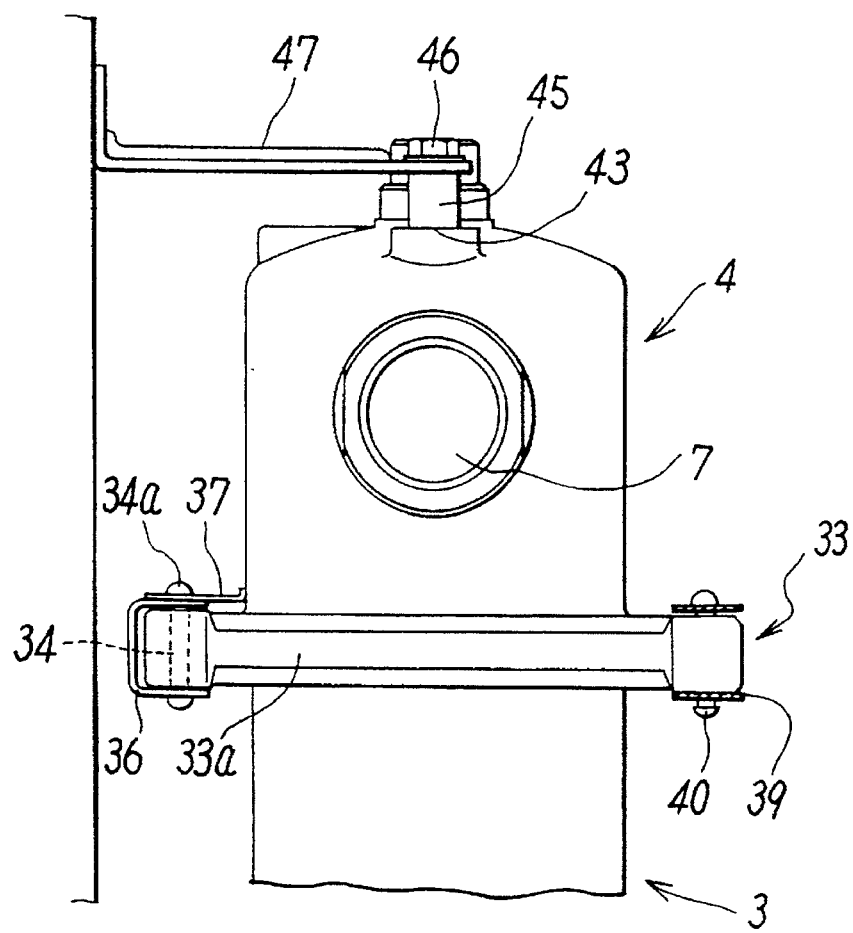
FIG. 5 is a partially cutaway front view of the filter cover of FIG. 4.
Figure 6:
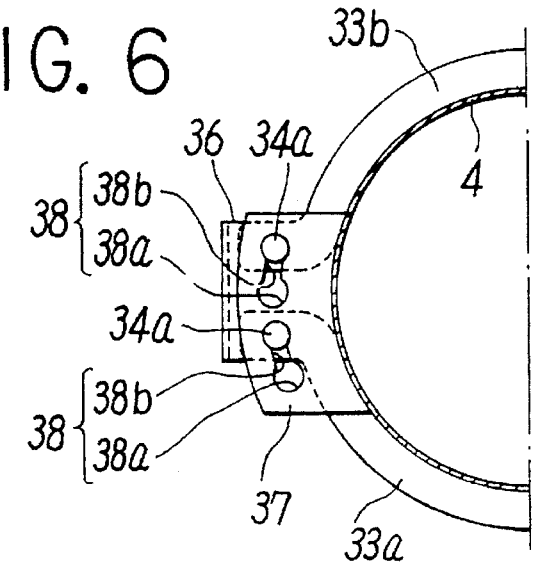
FIG. 6 is a plan view of an essential portion of FIG. 5.

As it is evident from FIG. 4 to FIG. 6, the tightening band 33 comprises a pair of members 33a and 33b designed approximately in semi-circular shape, and the base end of each of the members is rotatably supported on the filter cover 4 by a pin 34 respectively, and the forward end of each of the members 33a and 33b is fastened by a butterfly screw 35. Specifically, the base end of each of said pair of the members 33a and 33b is rotatably mounted on a channel-shaped connectiong hardware 36 by means of the pin 34. In contrast, on outer side of the filter cover 4, a band mounting fixture 37 is mounted. On the band mounting fixture 37, there are provided a large diameter portion 38a, where a large diameter sector 34a of the pin 34 can pass through, and two pin holes 38 and 38, each having an arcuate narrowed portion 38b, in which a head of the pin 34 can be engaged. The head 34 of each of the two pins 34 and 34 is inserted into each of the pin holes 38 via the large diameter portion 38a from the lower surface of the band mounting fixture 37, and these pins 34 and 34 are moved toward the narrowed portion 38b and are locked. Thus, the two members 33a and 33b are removably mounted on the band mounting fixture 37 in such manner that the members can be rotated around the pins 34.

On the forward end of one of the members 33a, a frame body 39 having the butterfly screw 35 is rotatably supported by a pin 40. By rotating the frame body 39, the forward end of the other member 33b is inserted into the frame body 39. By tightening the butterfly screw 35, the forward ends of the two members 33a and 33b are closed.

Further, on upper wall of the filter cover 4, a flat portion 43 for mounting and a vent hole 44 are provided. The flat portion 43 is provided with a spacer 45 having a threaded hole, and a bracket 47 is fixed on the spacer 45 by means of a mounting bolt 46, and a filter system 1 is fixed by the bracket 47 at an adequate position of the equipment. However, the fixing means in the filter system of the present invention is not limited to the bracket 47 as described above.

A plug 48 is mounted in the vent hole 44. Although not shown in the figure, a differential pressure indicator may be mounted in the vent hole 44 instead of the plug 48. When the differential pressure indicator is mounted in the vent hole 44, it is possible to identify clogging condition of the filter element 2 from outside.

In the filter system 1 with the above arrangement, when the filter element 2 is placed into the filter case 3, which has been removed from the filter cover 4, the bottom of the filter element 2 is elastically supported by the holding pieces 17a and the intermediate portion is elastically supported by the supporting pieces 22. Thus, the filter element 2 is placed in the filter case 3 without being inclined.

In the filter case 3 with the filter element 2 accommodated in it, the projections 25 of the filter cover 4 are positioned to match the positions of the vertical channel 26a of the engaging recess 26, and the attachment 9 of the filter element 2 is positioned to match the lower end of the element mounting unit 8. It is then applied on the lower portion of the filter cover 4 and is pushed upward against resilient force of the spring 15 and is rotated around axial line. The projections 26 are engaged and locked in the tranverse channel 26b of the engaging recess 26, and the filter case 3 is fixed on the filter cover 4. At the same time, the attachment 9 of the filter element 2 is fluid-tightly inserted into an opening of the element mounting unit 8, and the filter element 2 is pressed on the filter cover 4.

In this case, the transverse channel 26b of the engaging recess 26 is slightly inclined, and by rotating the filter case 3 and moving the projections 25 along the transverse channel 26b, the filter case 3 is pulled closer to the filter cover 4, and the seal ring 31 is compressed and sandwiched between the swelling portion 20 of the filter case 3 and the swelling portion 30 of the filter cover 4. As a result, the gap between the filter case 3 and the filter cover 4 is sealed. Because the finger attachment 27 is arranged on the filter case 3, it is easy to hold the filter case 3 or to push it up or rotate it.

The transverse channel 26b of the engaging recess 26 may not be necessarily inclined, but it may be positioned horizontally.

When the filter case 3 is held and is rotated in reverse direction to that of the mounting operation, the projections 25 are disengaged from the engaging recesses 26, and the filter case 3 can be separated from the filter cover 4.

Because insertion and removal of the filter case 3 can be carried out by a continuous series of operation, the working time is short. Because it is simple and easy to press the filter case 3 on the filter cover 4 and to rotate, a single worker can carry out this operation.

In case the pressure of the fluid to be filtered is as low as 2 to 3 kg/cm2, the filter case 3 and the filter cover 4 can be fixed together only by engagement of the projections 25 with the engaging recesses 26. If the fluid pressure is as high as 4 to 10 kg/cm2, the filter case 3 may be separated. In such case, the fluid to be filtered under high pressure may be forced out and working environment may be contaminated. Accordingly, it is desirable to use the tightening band 33 and to firmly fix the filter cover 4 and the filter case 3 together.

In using the tightening band 3, the head 34a of the pin 34 is inserted into the pin hole 38 of the band mounting fixture 37 and to engage it in the narrowed portion 38b. Thus, the tightening band 33 is mounted on the mouning fixture 14. Channel walls of a pair of the members 33a and 33b, each having channel-shaped cross-section, are pressed on the tapered surfaces 20a and 30a of the swelling portions 20 and 30, and the two members 33a and 33b are fastened together by means of the butterfly screw 35 mounted on the frame body 39. As a result, the filter case 3 and the filter cover 4 are firmly fixed together.

The above tightening operation of the tightening band 33 is carried out under the condition where the filter case 3 is already mounted on the filter cover 4 by engagement of the projections 25 with the engaging recesses 26. This is different from the case of the conventional filter system already known, in which the operation is carried out by pressing the filter case on the filter cover against the resilient force of spring. Thus, the tightening operation can be done easily and safely by a single worker. When the tightening of the tightening band 33 is released to disengage the filter case 3 from the filter cover 4, the projections 25 are still engaged in the engaging recesses 26. As a result, the filter case 3 is not dropped off from the filter cover 4 by resilient force of the spring 15, and the operation can be carried out safely by a single worker.

In the epxeriment performed by the inventors, it took 15 minutes in average to replace the filter element 2 by two workers in a conventional type filter system, while the operation could be completed only in about 7 minutes by a single worker in the filter system of the present invention.

Further, the tightening band 33 is removably mounted on the band mouning fixture 37. In this respect, the tightening band 33 can be mounted and used only when necessary, and this eliminates wasteful use of the components in the system.

Figure 7:
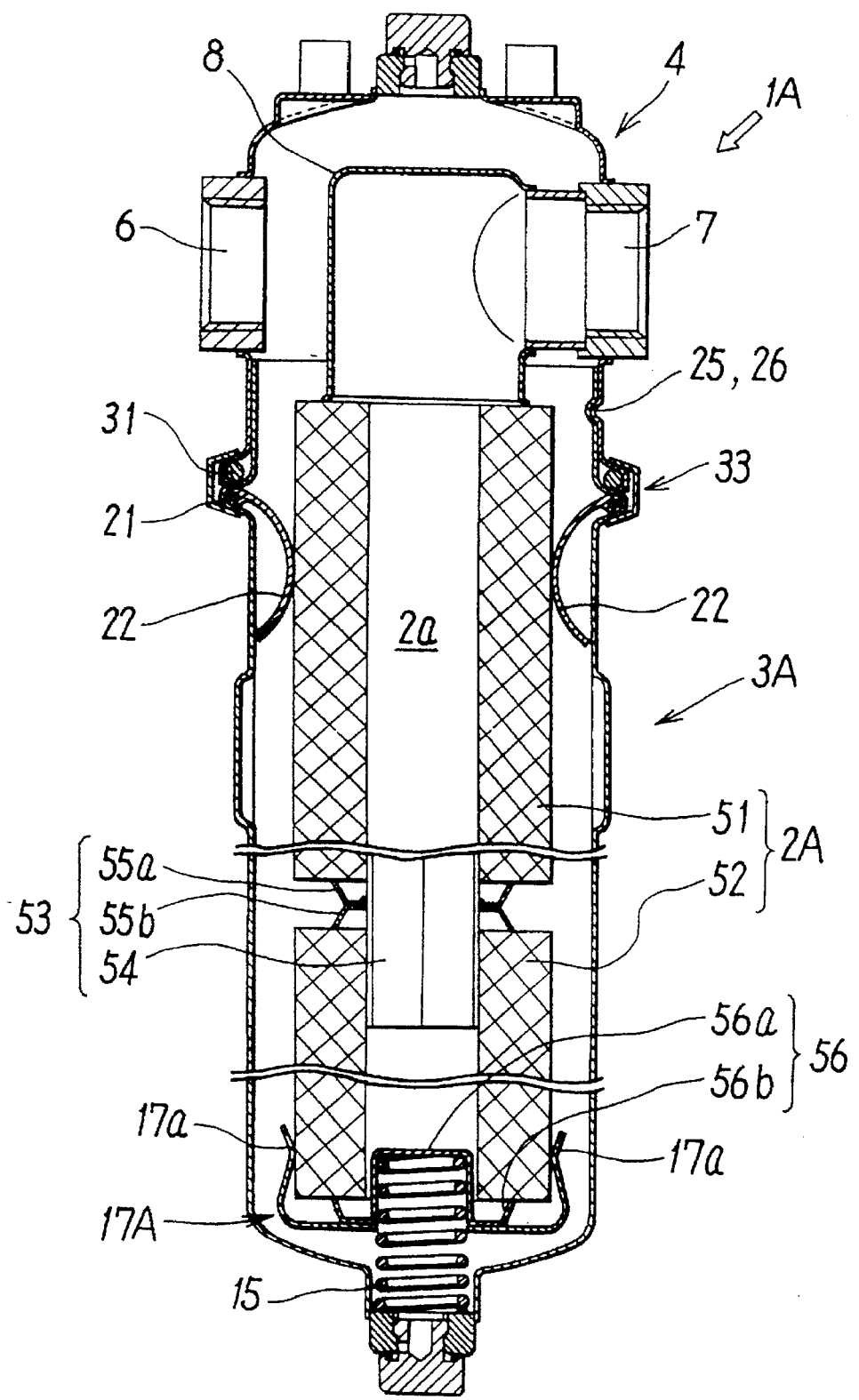
FIG. 7 is a longitudinal sectional view of a second embodiment of the filter system of the present invention.

FIG. 7 represents a second embodiment of the filter system of the present invention. In this filter system 1A, the structures of a filter element 2A and an element holder 17A to hold the lower end of the element are different from those of the first embodiment.

Specifically, the filter element 2A is designed longer than the filter element 2 of the first embodiment because a first and a second cylindrical members 51 and 52 are connected with each other by an intermediate holder 53, and upper and lower ends of a hollow portion 2a are opened. The upper end of the filter element 2A is pressed on the lower end of the element mounting unit 8, and perfect sealing is achieved. Because the filter element 2A is longer than the conventional system, axial length of the filter case 3A is longer accordingly than in the first embodiment.

The intermediate holder 53 comprises an insert 54 forcibly inserted into a hollow portion inside the first member 51 and the second member 52 and having a V-shaped cross-section and dish-shaped pressing pieces 55a and 55b mounted at the middle portion of the insert and being directed in upward and downward directions. When the pressing pieces 55a and 55b are elastically pressed on end surfaces of the two members 51 and 52, the gap between the members 51 and 52 is sealed.

A spring seat 56 with the element holder 17a mounted on it comprises an insert 56a to be engaged in the hollow portion of the second member 52 and a dish-shaped pressing unit 56b. A spring 15 is provided in the insert 56a, and the pressing unit 56b is pressed on the lower end of the second member 52 to achieve perfect sealing.

The other arrangement and functions of the second embodiment are the same as in the first embodiment, and the same component is referred by the same symbol. Thus, detailed description is not given here.

In the above embodiments, the projections are provided on the filter cover 4 and the engaging recesses 26 are arranged on the filter case 3 or 3A, while this may be reversed, i.e. the projections 25 may be provided on the filter case 3 or 3A and the engaging recesses 26 may be arranged on the filter cover 4.

What we claim are:

1. A filter system for filtering a fluid, the filter system comprising:
   a filter cover having a diameter, an axial direction, an inside, an open end edge, an inner side wall, an outer side wall, an inlet port for introducing the fluid into the filter system, an outlet port for discharging the fluid from the filter system, and a cylindrical engagement portion, the filter cover is located in one fixed position;
   a filter case having a diameter, an axial direction, an open edge end, a cylindrical engagement portion for connecting with the filter cover cylindrical engagement portion, an inner side wall, an outer side wall, an inside, and a bottom located on the inside;
   a plurality of projections and a plurality of engaging recesses located on the cylindrical engaging portion of the filter case and the filter cover, each of the plurality of engaging recesses having a vertical channel extending in the axial direction of the filter cover or the filter case, the vertical channel having a first end and a second end, the first end of the vertical channel formed at the open end edge of the filter cover or the filter case, and a transverse channel extending transversely in a circumferential direction from the second end of the vertical channel, the transverse channel is inclined in such a direction so that the filter case and the filter cover are pulled closer to each other when the plurality of projections move along the plurality of transverse channels of the engaging recesses, for removably connecting the filter case to the filter cover;
   a filter element having a cylindrical shape, a lower end, a middle portion, an outer surface, and an inner surface, the outer surface of the filter element is in fluidic communication with the inlet port of the filter cover, the inner surface of the filter element is in fluidic communication with the outlet port of the filter, cover, for filtering a fluid as it passes through the filter element from the outer surface to the inner surface of the filter element;
   spring means connected to the bottom of the filter case to elastically hold the filter element, in the axial direction, between the filter case and the filter cover;
   a filter element holder having a plurality of elastic holding pieces curved in arcuated form for elastically holding the lower end of the filter element between the holding pieces, and the filter element holder is connected to the spring means; and
   a plurality of elastic supporting pieces curved in arcuated form are attached to the inside of the filter case for elastically holding the middle portion of the filter element with the supporting pieces.

2. A filter system as recited in claim 1, further comprising flange-shaped swelling portions, a flange-shaped swelling portion is formed on each outer side wall periphery of the filter case and the filter cover respectively, each flange-shaped swelling portion having a tapered surface inclined in such a direction to create a diameter larger than the diameter of the cylindrical engaging portion of the filter cover and of the filter case respectively, and a tightening band having a channel-shaped cross-section arranged to surround the flange-shaped swelling portions so that the tapered surfaces of the respective flange-shaped swelling portions are squeezed and tightened towards each other by the channel-shaped cross-section of the tightening band.

3. A filter system as recited in claim 2, further comprising a band mounting fixture connected to the filter cover, and the tightening band having two members with channel-shaped cross-sections connected to the band mounting fixture so that the tightening band is able to be opened and closed about the flange-shaped swelling portions.

4. A filter system as recited in claim 2, further comprising a ring attached to the plurality of elastic supporting pieces, the ring being provided interior of the flange-shaped swelling portion on the inner side wall of the filter case.

5. A filter system as recited in claim 2, further comprising a seal ring situated between the flange-shaped swelling portion of the filter case and the flange-shaped swelling portion of the filter cover for sealing a gap between the filter case and the filter cover.

6. A filter system as recited in claim 5, further comprising a band mounting fixture connected to the filter cover, and the tightening band having two members with channel-shaped cross-sections connected to the band mounting fixture so that the tightening band is able to be opened and closed about the flange-shaped swelling portions.

7. A filter system as recited in claim 5, further comprising a ring attached to the plurality of elastic supporting pieces, the ring being provided interior of the flange-shaped swelling portion on the inner side wall of the filter case.

8. A filter system for filtering a fluid, the filter system comprising:
   a filter cover having a diameter, an axial direction, an inside, an open end edge, an inner side wall, an outer side wall, an inlet port for introducing the fluid into the filter system, an outlet port for discharging the fluid from the filter system, and a cylindrical engagement portion, the filter cover is located in one fixed position;
   a filter case having a diameter, an axial direction, an open end edge, a cylindrical engagement portion for connecting with the filter cover cylindrical engagement portion, an inner side wall, an outer side wall, an inside, and a bottom located on the inside;
   a plurality of projections and a plurality of engaging recesses located on the cylindrical engaging portion of the filter case and the filter cover, each of the plurality of engaging recesses having a vertical channel extending in the axial direction of the filter cover or the filter case, the vertical channel having a first end and a second end, the first end of the vertical channel formed at the open end edge of the filter cover or the filter case, and a transverse channel extending transversely in a circumferential direction from the second end of the vertical channel, the transverse channel is inclined in such a direction so that the filter case and the filter cover are pulled closer to each other when the plurality of projections move along the plurality of transverse channels of the engaging recesses, for removably connecting the filter case to the filter cover;
   a filter element having a cylindrical shape, a lower end, a middle portion, an outer surface, and an inner surface, the outer surface of the filter element is in fluidic communication with the inlet port of the filter cover, the inner surface of the filter element is in fluidic communication with the outlet port of the filter cover, for filtering a fluid as it passes through the filter element from the outer surface to the inner surface of the filter element;

spring means connected to the bottom of the filter case to elastically hold the filter element, in the axial direction, between the filter case and the filter cover;

flange-shaped swelling portions, a flange-shaped swelling portion is formed on each outer side wall periphery of the filter case and the filter cover respectively, each flange-shaped swelling portion having a tapered surface inclined in such a direction to create a diameter larger than the diameter of the cylindrical engaging portion of the filter cover and of the filter case respectively;

a seal ring situated between the flange-shaped swelling portion of the filter case and the flange-shaped swelling portion of the filter cover for sealing a gap between the filter case and the filter cover; and a tightening band having two members with channel-shaped cross-sections arranged to surround the flange-shaped swelling portions so that the tapered surfaces of the respective flange-shaped swelling portions are squeezed and tightened towards each other by the channel-shaped cross-section members of the tightening band.

9. A filter system as recited in claim 8, further comprising a band mounting fixture connected to the filter cover, and the two members with channel-shaped cross-sections of the tightening band are connected to the band mounting fixture so that the tightening band is able to be opened and closed about the flange-shaped swelling portions.

* * * * *